US009553535B2

(12) United States Patent
Aoshima

(10) Patent No.: US 9,553,535 B2
(45) Date of Patent: Jan. 24, 2017

(54) MOTOR DRIVING APPARATUS

(71) Applicant: CANON KABUSHIKI KAISHA, Tokyo (JP)

(72) Inventor: Chikara Aoshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/652,429

(22) PCT Filed: Dec. 19, 2013

(86) PCT No.: PCT/JP2013/007468
§ 371 (c)(1),
(2) Date: Jun. 15, 2015

(87) PCT Pub. No.: WO2014/103258
PCT Pub. Date: Jul. 3, 2014

(65) Prior Publication Data
US 2015/0326157 A1    Nov. 12, 2015

(30) Foreign Application Priority Data

Dec. 27, 2012 (JP) ................................. 2012-284086

(51) Int. Cl.
*G05B 19/40* (2006.01)
*H02P 8/14* (2006.01)
(Continued)

(52) U.S. Cl.
CPC ............... *H02P 8/14* (2013.01); *H02K 11/215* (2016.01); *H02K 29/08* (2013.01); *H02K 37/14* (2013.01); *H02P 8/06* (2013.01); *H02P 8/38* (2013.01)

(58) Field of Classification Search
CPC . H02K 2213/03; H02K 2213/09; H02K 23/38
See application file for complete search history.

(56) References Cited

U.S. PATENT DOCUMENTS 6,943,523 B2    9/2005  Feres
2009/0072677 A1  3/2009  Yasuda
(Continued)

FOREIGN PATENT DOCUMENTS

CN    104052352 A    9/2014
FR    2820252 A1    8/2002
(Continued)

OTHER PUBLICATIONS

The International Search Report of PCT/JP2013/007468 Mar. 18, 2013.
(Continued)

*Primary Examiner* — Karen Masih
(74) *Attorney, Agent, or Firm* — Cowan, Liebowitz & Latman, P.C.

(57) ABSTRACT

A motor driving apparatus includes a rotor, a first yoke including a first magnetic portion, a first coil configured to, if energized, excite the first magnetic portion, a second yoke including a second magnetic portion, a second coil configured to, if energized, excite the second magnetic portion, a detecting portion including a first detection element, a second detection element, a third detection element, and a fourth detection element, each detection element being configured to detect a rotation position of the rotor, and a controller configured to switch a pole excited by the first magnetic portion and the second magnetic portion by switching an energization direction of the first coil and the second coil based on an output of the detecting portion.

6 Claims, 6 Drawing Sheets

(51) Int. Cl.
  *H02K 37/14* (2006.01)
  *H02P 8/38* (2006.01)
  *H02K 29/08* (2006.01)
  *H02P 8/06* (2006.01)

(56) References Cited

U.S. PATENT DOCUMENTS

| 2010/0097021 | A1 | 4/2010 | Kiyamura | |
| 2012/0086297 | A1* | 4/2012 | Makino | H02K 23/30 310/203 |
| 2014/0265992 | A1 | 9/2014 | Mizuo | |

FOREIGN PATENT DOCUMENTS

| JP | 02-023092 A | 1/1990 |
| JP | 06-067259 A | 8/1994 |
| JP | 2002-359997 A | 12/2002 |
| JP | 2006-105652 A | 4/2006 |
| JP | 2011-101480 A | 5/2011 |
| JP | 2012-002985 A | 1/2012 |
| JP | 2012-068921 A | 4/2012 |
| RU | 2118039 C1 | 8/1998 |

OTHER PUBLICATIONS

Jun. 20, 2016 Korean Office Action, English translation, that issued in Korean Patent Application No. 10-2015-7016423.
Extended European Search Report issued on Sep. 30, 2016, that issued in the corresponding European Patent Application No. 13867328.0.
Oct. 7, 2016 Russian Decision on Grant and Search Report, that issued in Russian Patent Application No. 2015119027.

\* cited by examiner

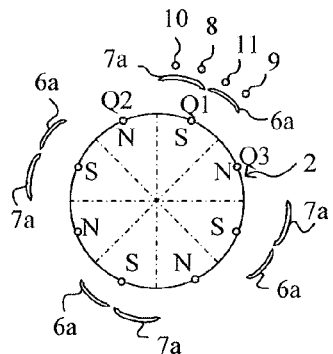 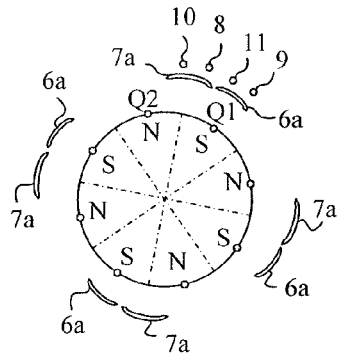 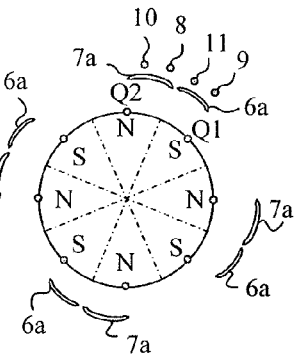
FIG. 6A  FIG. 6B  FIG. 6C
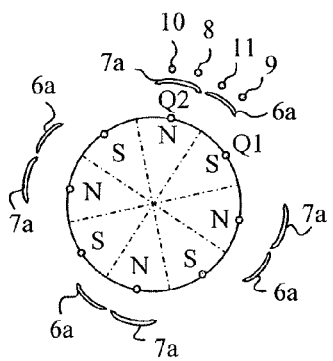 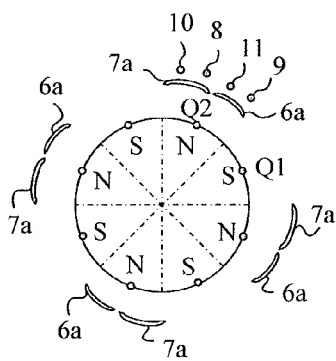 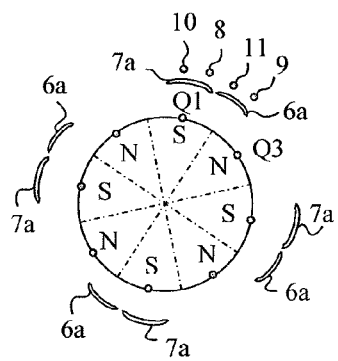
FIG. 6D  FIG. 6E  FIG. 6F
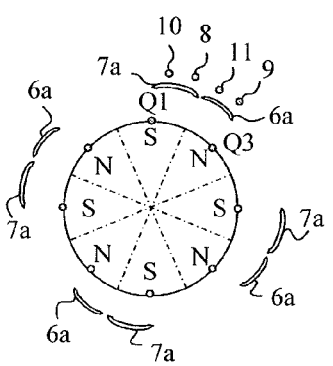 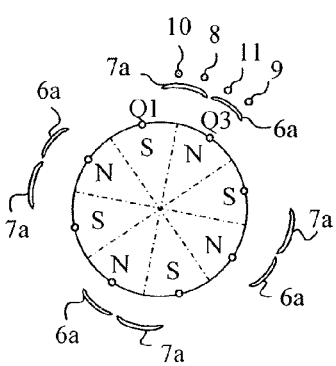 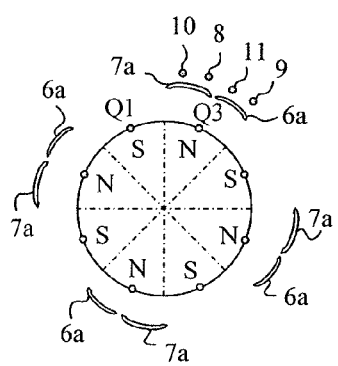
FIG. 6G  FIG. 6H  FIG. 6I

MOTOR DRIVING APPARATUS

CROSS-REFERENCE TO RELATED APPLICATIONS

This application is a national stage application of International Application No. PCT/JP2013/007468, filed on Dec. 19, 2013, the entire disclosure of which is hereby incorporated by reference.

TECHNICAL FIELD

The present invention relates to a motor driving apparatus including a position detector.

BACKGROUND ART

Because of their various advantages such as small size, high torque, and long life, stepping motors can easily perform digital positioning operations with open-loop control. This fact has led to a wide range of applications to, for example, information devices such as cameras and optical disk devices, and office automation equipments such as printers and projectors.

However, stepping motors have distinct disadvantages such as loss of synchronization during high speed rotation or under heavy load, and lower efficiency than that of brushless motors or DC motors.

One known technology to solve these disadvantages is to prevent loss of synchronization by causing an encoder equipped with a stepping motor to perform operations of a so-called brushless motor in which an energization is switched in response to the position of a rotor (See Japanese Patent No. 06-067259 and Japanese Patent Laid-Open No. 2002-359997). This technology allows high speed operation by switching a current passed through each coil by a signal which is generated by a noncontact sensor built in the motor and is phase-advanced in response to the speed of the motor to make up for a delay in current rise time.

FIG. 8 illustrates torques acting on the motor disclosed in Japanese Patent No. 06-067259 and Japanese Patent Laid-Open No. 2002-359997 when a constant current is passed through each coil of the motor. A current in the positive direction and a current in the reverse direction can be passed through each of two coils, resulting in four different torque curves. Each such torque has an almost sinusoidal waveform and a phase difference expressed as an electrical angle of 90 degree. Electrical angle as used herein means an angle expressed by using one period of the sinusoidal waveform which is 360 degree. When the pole number of a rotor is n, the mechanical angle is expressed as electrical angle×2/n.

An ideal sequential switching of the energization of a motor during its rotation can, on all occasions, achieve a high torque such as T1 indicated with a bold line of FIG. 8A. In such switching, a switching timing of the energization of the coil is determined by a signal generated from each magnetic sensor. The arrangement of two magnetic sensors at an interval of electrical angle of 90 degree permits the switching of energization at the best efficiency.

SUMMARY OF INVENTION

Technical Problem

However, an error in the attachment positions of magnetic sensors leads to the accuracy loss of a torque curve such as indicated by T2 illustrated in FIG. 8B, which brings about a decrease in the efficiency of a motor. This fact requires an additional process of adjusting the attachment positions of the magnetic sensors when assembling a motor. This has been one factor of increase in cost and reduction in quality.

Japanese Patent Laid-Open No. 2002-359997 discloses a technology in which a delay time is set that starts from the detection of a rotor rotation position performed by magnetic sensors to accommodate sensor arrangement errors and variations in magnetization angle, thereby performing the switching of energization to each coil.

However, a sharp variation in load during a delay time results in a difference in expected rotor rotation position and actual one, causing a loss of synchronization. In addition, a rotor needs to be driven only with normal time control during several steps for stable delay-time setting. A sharp variation in load during such steps may cause further loss of synchronization.

Solution to Problems

In light of such problems, it is an object of the present invention to provide a motor driving apparatus which is capable of setting a plurality of advance angles with no delay time and thus causes no loss of synchronization.

A motor driving apparatus as an aspect of the present invention includes a rotor including a magnet, the magnet being cylindrical shaped and divided, in a peripheral direction, into sections each with an outer periphery, each section having a different polarity from adjacent sections, a first yoke including a first magnetic portion, the first yoke being opposed to the outer periphery of the magnet, a first coil configured to, if energized, excite the first magnetic portion, a second yoke including a second magnetic portion, the second yoke being opposed to the outer periphery of the magnet at a position displaced by an electrical angel of approximately 90 degrees relative to the first magnetic portion, a second coil configured to, if energized, excite the second magnetic portion, a detecting portion including a first detection element, a second detection element, a third detection element, and a fourth detection element, each detection element being configured to detect a rotation position of the rotor, and a controller configured to switch a pole excited by the first magnetic portion and the second magnetic portion by switching an energization direction of the first coil and the second coil based on an output of the detecting portion. The first detection element is arranged at a position where an advance angle amount from a position at which an electrical advance angle from an excitation switching timing of each first magnetic portion is 0 degree is smaller than a delay angle amount from a position at which an electrical advance angle from an excitation switching timing of each first magnetic portion is 90 degrees if the rotor is caused to rotate in a first rotation direction and if a pole excited by the first magnetic portion is switched based on an output of the first detection element. The second detection element is arranged at a position where an advance angle amount from a position at which an electrical advance angle from an excitation switching timing of each second magnetic portion is 0 degree is smaller than a delay angle amount from a position at which an electrical advance angle from an excitation switching timing of each second magnetic portion is 90 degrees if the rotor is caused to rotate in the first rotation direction and if a pole excited by the second magnetic portion is switched based on an output of the second detection element. The third detection element is arranged at a position where an advance angle amount from a position at which an electrical advance angle from an excitation switching timing of each first magnetic portion is 0 degree is larger than a delay angle amount from a position at which an electrical advance angle from an excitation switching timing of each first magnetic portion is 90 degrees if the rotor is caused to rotate in the first rotation direction and if a pole excited by the first magnetic portion is switched based on an output of the third detection element. The fourth detection element is arranged at a position where an advance angle amount from a position at which an electrical advance angle from an excitation switching timing of each second magnetic portion is 0 degree is larger than a delay angle amount from a position at which an electrical advance angle from an excitation switching timing of each second magnetic portion is 90 degrees if the rotor is caused to rotate in the first rotation direction and if a pole excited by the second magnetic portion is switched based on an output of the fourth detection element.

Further features of the present invention will become apparent from the following description of an exemplary embodiment with reference to the attached drawings.

Advantageous Effects of Invention

The present invention provides a motor driving apparatus which is capable of setting a plurality of advance angles with no delay time and thus causes no loss of synchronization.

BRIEF DESCRIPTION OF DRAWINGS

FIGS. 6A to 6I are cross-sectional views in a direction at right angles to the motor axis which illustrate the phase relationship among the yokes, magnetic sensors, and magnets.

DESCRIPTION OF EMBODIMENTS

A preferred embodiment of the present invention will be described below in detail with reference to the attached drawings.

Figure 1:
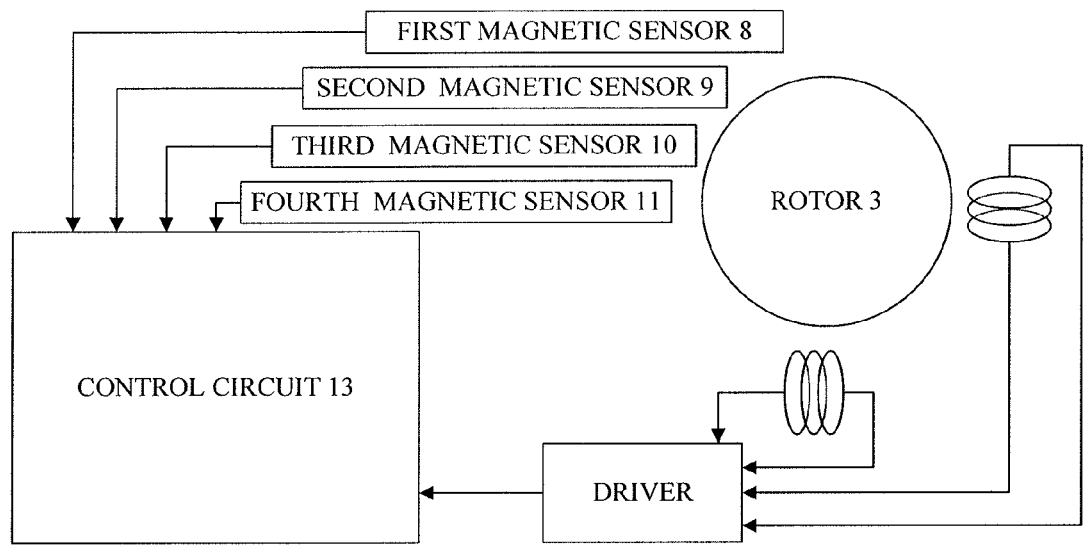
FIG. 1 is a block diagram of a motor driving apparatus according to an embodiment of the present invention.
Figure 2:
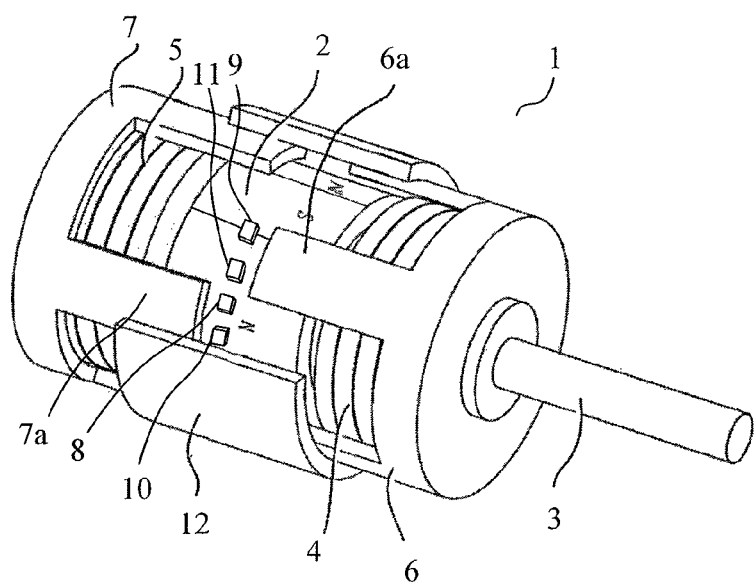
FIG. 2 is an external perspective view of the motor.

FIG. 1 is a block diagram of a motor driving apparatus according to an embodiment of the present invention, and FIG. 2 an external perspective view of the motor. It should be noted that some components are illustrated as cutaways for explanation purposes.

A rotor 3 includes a magnet 2 and is rotatably controlled by a control circuit (a controller) 13. The magnet 2 is cylindrical shaped and divided, in a peripheral direction, into sections each with an outer periphery, each section having a different polarity from adjacent sections. In this embodiment, the magnet 2 is divided into eight sections, i.e., eight magnetized sections, but the pole number may be, for example, four or twelve.

A first coil 4 is arranged at one end of the magnet 2 in an axis direction.

A first yoke 6, which is composed of a soft magnetic material, is opposed to the outer periphery of the magnet 2, there being a gap between the first yoke 6 and the outer periphery. The first yoke 6 includes a plurality of first magnetic portions 6a extending from a cylindrical shaped body to the axis direction and arranged in the periphery direction at predetermined intervals. The first magnetic portions 6a are excited by energizing the first coil 4.

The first coil 4, the first yoke 6, and the magnet 2 opposed to the first magnetic portions 6a together constitute a first stator unit.

A second coil 5 is arranged at the end opposed to the other end in the axis direction at which the first coil 4 of the magnet 2 is attached.

A second yoke 7, which is composed of a soft magnetic material, is opposed to the outer periphery of the magnet 2, there being a gap between the second yoke 7 and the outer periphery. The second yoke 7 includes a plurality of second magnetic portions 7a extending from a cylindrical shaped body to the axis direction and arranged in the periphery direction at predetermined intervals. The second magnetic portions 7a are excited by energizing the second coil 5.

The second coil 5, the second yoke 7, and the magnet 2 opposed to the second magnetic portions 7a together constitute a second stator unit.

A switching of a pole (N pole/S pole) excited by the first magnetic portions 6a and the second magnetic portions 7a allows a torque given to the rotor 3 to be changed.

A first magnetic sensor (a first detection element) 8, a second magnetic sensor (a second detection element) 9, a third magnetic sensor (a third detection element) 10, and a fourth magnetic sensor (a fourth detection element) 11 together constitute a detector. Each magnetic is a hall element that detects magnetic flux of the magnet 2 and is fixed to a motor cover 12.

The motor cover 12 fixes and maintains the first yoke 6 and the second yoke 7 such that the first magnetic portions 6a and the second magnetic portions 7a are arranged in an electrical angle of approximately 90 degree relative to the magnetization phase of the magnet 2.

Electrical angle as used herein means an angle expressed by using one period of the magnetic force of the magnet 2 which is 360 degree. When the pole number of the rotor 3 is M and the mechanical angle is $\theta 0$, the electrical angle $\theta$ can be expressed by the following equation.

$$\theta = \theta 0 \times M/2$$

Since the number of poles magnetized in this embodiment is eight, an electrical angle of 90 degree is equal to a mechanical angle of 22.5 degree.

The operation of a feedback energization switching mode will be described below using an electrical angle.

Figure 3:
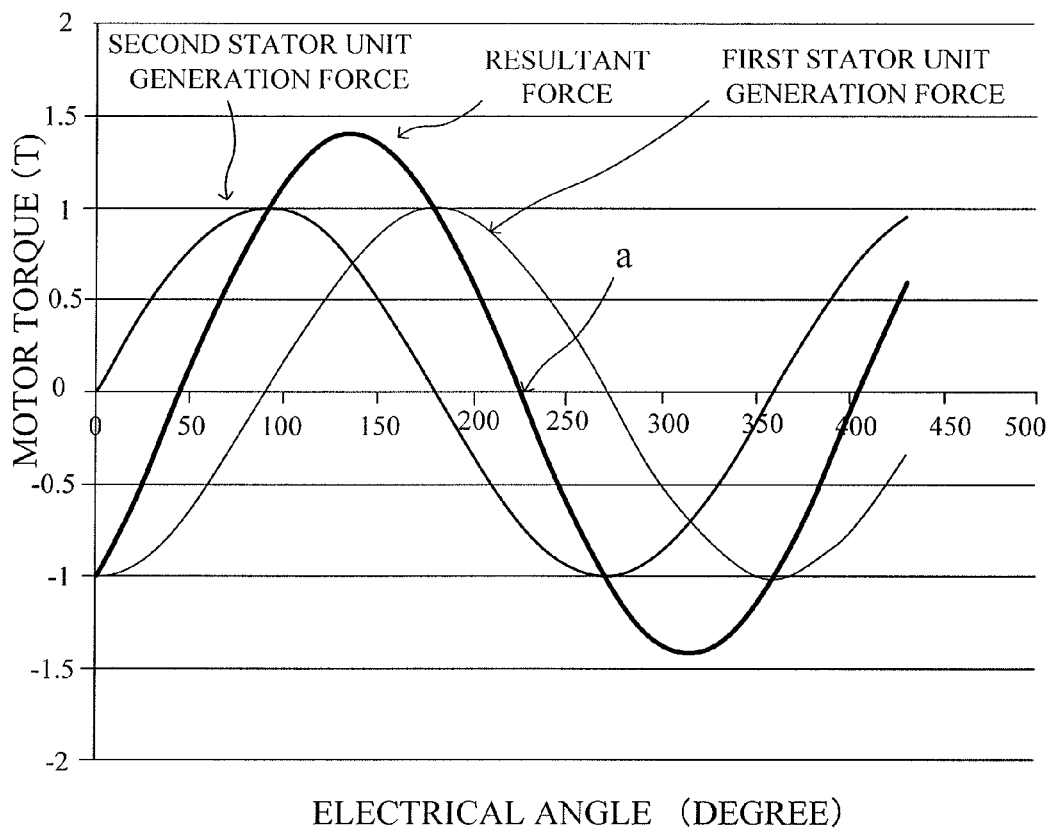
FIG. 3 is a relationship diagram of a rotor rotation angle and a motor torque.

FIG. 3 illustrates the relationship between the rotation angle of the rotor 3 and the torque of the motor 1 when a constant current is passed through the coils of the motor 1. The horizontal axis represents an electrical angle, and the vertical axis a motor torque, respectively. A torque causing the rotor 3 to be rotated clockwise is defined as positive.

Figures 4A, 4B:
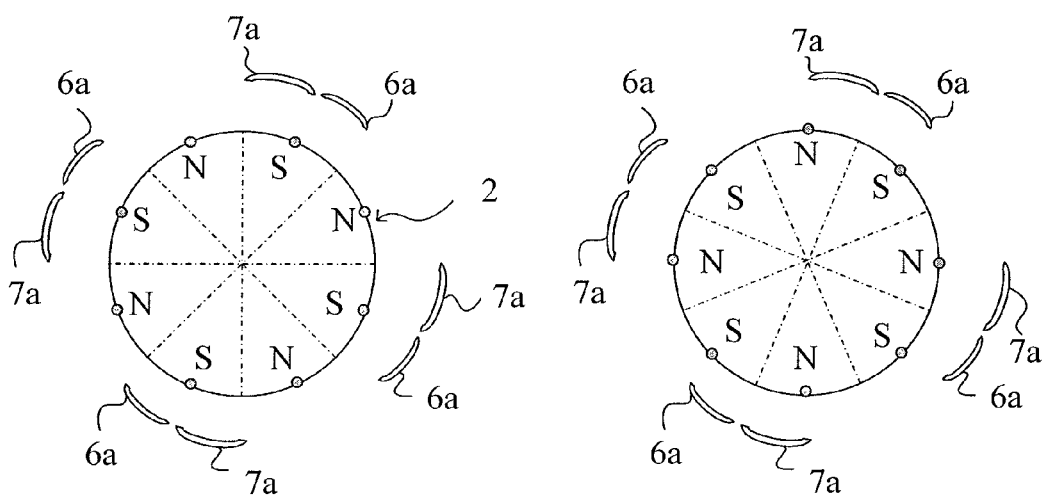
FIGS. 4A and 4B are cross-sectional views in a direction at right angles to a motor axis which illustrate the phase relationship between yokes and magnets.

FIGS. 4A and 4B are cross-sectional views in a direction at right angles to the motor axis which illustrate the phase relationship between each yoke and the magnet 2.

It is hypothesized that a positive current passed through the first coil 4 causes the first magnetic portions 6a to be magnetized, and a positive current passed through the second coil 5 causes the second magnetic portions 7a to be magnetized.

The phase in a state as illustrated in FIG. 4A is indicated with a sign "a" in FIG. 3. FIG. 4A illustrates a state in which the distance from the centers of magnetized poles to the first magnetic portions 6a and the distance from the centers of the poles to the second magnetic portions 7a are the same. In the state illustrated in FIG. 4A, a force maintaining a rotation phase is generated, but a rotation driving force is not generated. This is because the S poles of the magnet 2 are attracted by the first magnetic portions 6a and the second magnetic portions 7a and thus remain in such state.

The second magnetic portions 7a are excited to be S poles from the state illustrated in FIG. 4A, which causes the rotor 3 to rotate to proceed to the state illustrated in FIG. 4B.

In FIG. 4B, in the same way as the state illustrated in FIG. 4A, a force maintaining a rotation phase is generated, but a rotation driving force is not generated. More specifically, the S poles and the N poles of the magnet 2 are attracted by the first magnetic portions 6a and the second magnetic portions 7a, respectively, and remain in such state.

In the same manner as described above, the rotor 3 can be caused to continuously rotate by switching the energization directions of the first coil 4 and the second coil 5 to switch the polarities of the first magnetic portions 6a and the second magnetic portions 7a.

The switching of poles excited by the first magnetic portions 6a and the second magnetic portions 7a in the timing that such rotation driving force is not generated is hereinafter referred to as energization switching with an electrical advance angle of 0 degree. The switching of poles excited by the first magnetic portions 6a and the second magnetic portions 7a in the timing earlier than such timing is hereinafter referred to as excitation switching with an electrical advance angle of $\gamma$ degree.

Figure 5A:
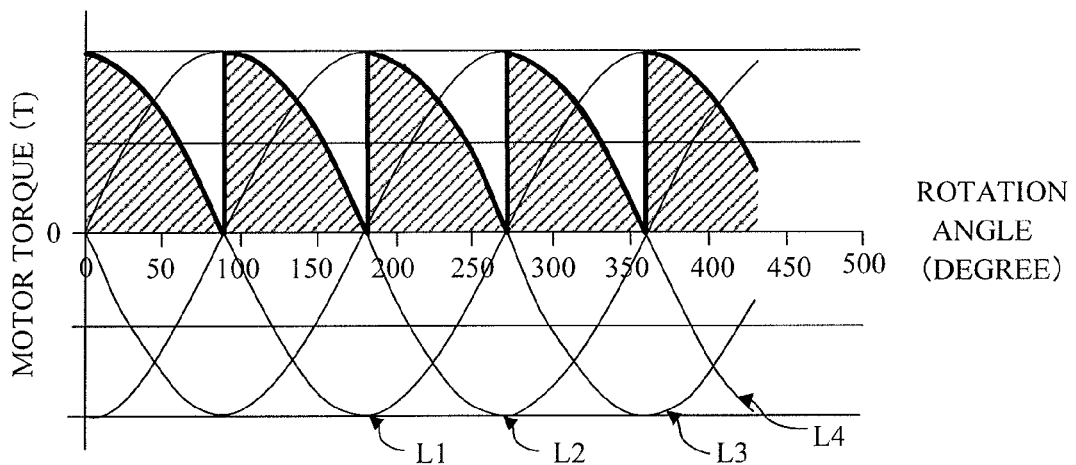
FIGS. 5A to 5C illustrate torques acting on the rotor when a constant current is passed through the coils of the motor.
Figure 5B:
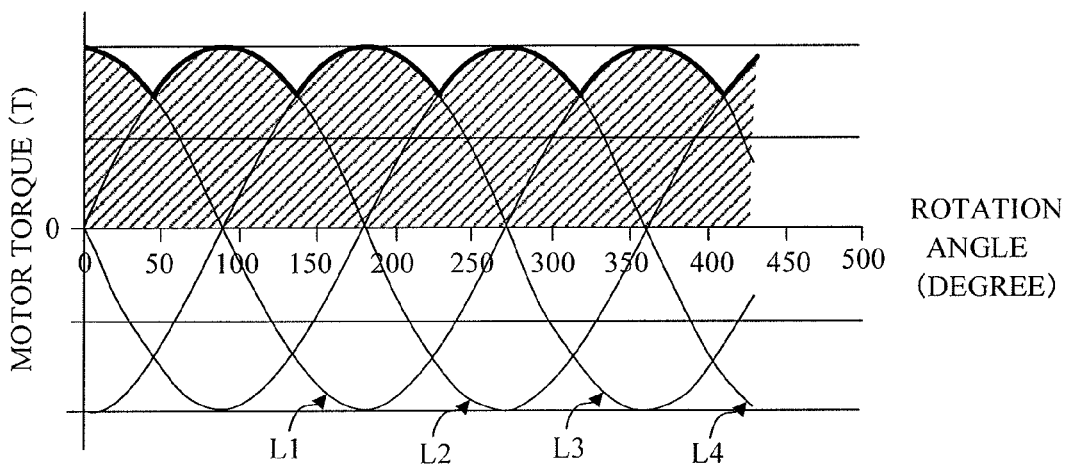
Figure 5C:
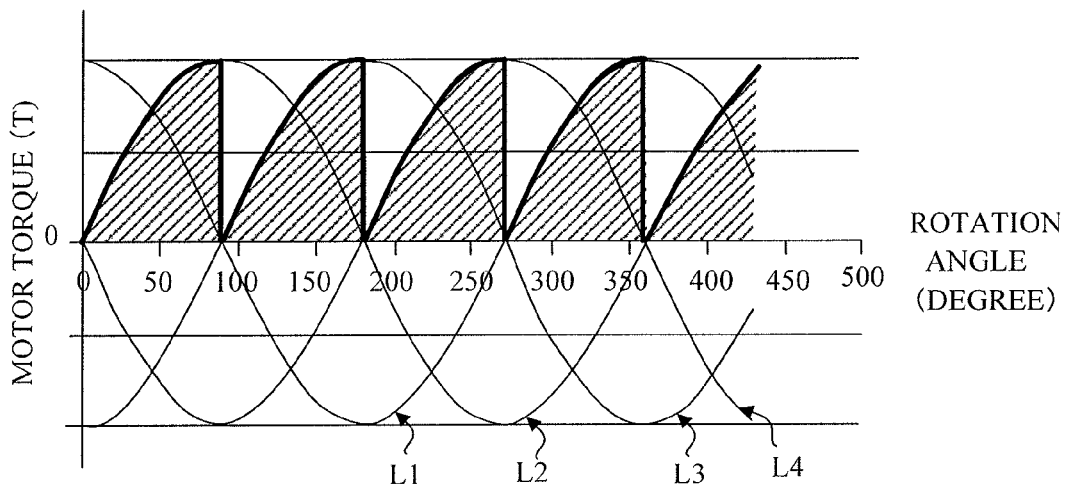

FIGS. 5A to 5C are diagrams illustrating a rotor rotation angle as a horizontal axis and a motor torque generated when the first coil 4 and the second coil 5 are energized as a vertical axis. The horizontal axis is expressed by an electrical angle.

L1 is a torque curve observed when the energization direction relative to the first coil 4 is positive and the energization direction relative to the second coil 5 is positive. L2 is a torque curve observed when the energization direction relative to the first coil 4 is positive and the energization direction relative to the second coil 5 is reverse. L3 is a torque curve observed when the energization direction relative to the first coil 4 is reverse and the energization direction relative to the second coil 5 is reverse. L4 is a torque curve observed when the energization direction relative to the first coil 4 is reverse and the energization direction relative to the second coil 5 is positive.

FIG. 5A illustrates a state observed when the electrical advance angel is 0 degree. However, the sequential switching of energization direction relative to each coil in such timing does not yield a large output as an output of the motor 1. The reason for this is that the motor torque is, as indicated with oblique-lined portions and a bold line, extremely small in the phase observed immediately prior to the switching of energization direction.

FIG. 5B illustrates a state observed when the electrical advance angle is 45 degrees. In this state, a motor torque generated when the energization direction is switched is maximized.

The switching of the energization direction relative to each coil with an electrical advance angle of 90 degrees at an earlier timing yields a motor torque indicated with oblique-lined portions as illustrated in FIG. 5C. The resulting torque has a value similar to that obtained when the electrical advance angel is 0 degree. This means that a large rotation driving force cannot be obtained.

In this embodiment, a large rotation driving force can be obtained even when an energization direction is switched by arranging each magnetic sensor, relative to each yoke, at its corresponding position described below.

Referring to FIGS. 6A to 6I, actual operations of the motor 1 will be described, with a default state being the state illustrated in FIG. 6A.

(1) Clockwise Rotation (1-i) Driving with Low Advance Angle

An explanation will be given of clockwise rotation operations of the rotor 3 (first energization mode). These operations are done by switching the excitation state of each first magnetic portion 6a by an output signal generated from the first magnetic sensor 8 and by switching the excitation state of each first magnetic portion 7a by an output signal generated from the second magnetic sensor 9. The clockwise direction in which the rotor 3 rotates is defined as a first rotation direction.

Each energization direction is switched in the following combination.

If the first magnetic sensor 8 detects an S pole of the magnet 2, each first magnetic portion 6a is excited to be an N pole. If the first magnetic sensor 8 detects an N pole of the magnet 2, each first magnetic portion 6a is excited to be an S pole.

If the second magnetic sensor 9 detects an S pole of the magnet 2, each second magnetic portion 7a is excited to be an S pole. If the second magnetic sensor 9 detects an N pole of the magnet 2, each second magnetic portion 7a is excited to be an N pole.

In the state illustrated in FIG. 6A, each of the first magnetic sensor 8 and the second magnetic sensor 9 detects an S pole of the magnet 2. As a result, each first magnetic portion 6a is excited to be an N pole and each second magnetic portion 7a an S pole respectively, causing a clockwise rotation force at both the rotor 3 and the magnet 2.

When the rotor 3 rotates clockwise from the state illustrated in FIG. 6A, a center Q1 of a magnetized pole of the magnet 2 and the center of each first magnetic portion 6a become opposed to each other as illustrated in FIG. 6B.

When the rotor 3 rotates clockwise from the state illustrated in FIG. 6B, the distance from the center Q1 of the magnetized pole of the magnet 2 to the first magnetic portion 6a and the distance from a center Q2 of the pole of the magnet 2 which pole is magnetized reversely compared with the center Q1 to the second magnetic portion 7a become, as illustrated in FIG. 6C, the same.

The first magnetic sensor 8 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the first magnetic sensor 8. This arrangement allows the first magnetic sensor 8 to detect an N pole of the magnet 2 at the time of the transition from the state illustrated in FIG. 6B to the state illustrated in FIG. 6C. At this transition, the first coil 4 is energized such that each first magnetic portion 6a is excited to be an S pole. In addition, since the second magnetic sensor 9 detects an S pole of the magnet 2, the second coil 5 is energized such that each second magnetic portion 7a is excited to be an S pole, causing a clockwise rotation force at both the rotor 3 and the magnet 2.

When the rotor 3 rotates clockwise from the state illustrated in FIG. 6C, the center Q2 of the magnetized pole of the magnet 2 and the center of the second magnetic portion 7a are opposed to each other as illustrated in FIG. 6D.

When the rotor 3 rotates clockwise from the state illustrated in FIG. 6D, the distance from the center Q2 of the magnetized pole of the magnet 2 to the first magnetic portion 6a and the distance from the center Q2 to the second magnetic portion 7a become, as illustrated in FIG. 6E, the same.

The second magnetic sensor 9 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the second magnetic sensor 9. This arrangement allows the second magnetic sensor 9 to detect an N pole of the magnet 2 at the time of the transition from the state illustrated in FIG. 6D to the state illustrated in FIG. 6E. At this transition, the second coil 5 is energized such that each second magnetic portion 7a is excited to be an N pole. In addition, since the first magnetic sensor 8 detects an N pole of the magnet 2, the first coil 4 is energized such that each first magnetic portion 6a is excited to be an S pole, causing a clockwise rotation force at both the rotor 3 and the magnet 2.

As described above, the energization is sequentially switched to cause the rotor 3 and the magnet 2 to continuously rotate clockwise.

The first magnetic sensor 8 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the first magnetic sensor 8. This means that the first magnetic sensor 8 is arranged at a position where the advance angle amount from the position at which the electrical advance angle from the excitation switching timing of each first magnetic portion 6a is 0 degree is smaller than the delay angle amount from the position at which the electrical advance angle from the excitation switching timing of each first magnetic portion 6a is 90 degrees. The second magnetic sensor 9 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the second magnetic sensor 9. This means that the second magnetic sensor 9 is arranged at a position where the advance angle amount from the position at which the electrical advance angle from the excitation switching timing of each second magnetic portion 7a is 0 degree is smaller than the delay angle amount from the position at which the electrical advance angle from the excitation switching timing of each second magnetic portion 7a is 90 degrees. These arrangements lead to a reduced deviation in phase compared with the phase observed in a state in which the excitation is maintained without switching of the energization direction of each coil even if the energization direction of each coil is switched based on the output of each magnetic sensor. Hence, there is not a large difference between the phase of the rotor 3 and the magnet 2 observed in the case of a normal stepping driving and that observed in the case of the driving by switching of the energization of each coil based on the output of each magnetic sensor. Consequently, a smooth operation switching can be performed with no vibration or oscillation even if the stepping driving and the brushless driving in which the output of each sensor is feedback-controlled are switched. The driving with such an electrical advance angle is desirable especially when the driving is started from a stop state or when the shift is made from a driving state to a stop state.

(1-ii) Driving with High Advance Angle

The faster the rotation speed of the rotor 3 becomes, the slower a speed in which each magnetic portion is magnetized by a counter electromotive force or an inductance component becomes. Thus, a large rotation driving force can be obtained by switching the energization direction of each coil relative to the rotation position of the rotor 3 at an earlier timing.

An explanation will be given of clockwise rotation operations of the rotor 3 (second energization mode). These operations are done by switching the excitation state of each first magnetic portion 6a based on an output signal generated from the third magnetic sensor 10 and by switching the excitation state of each second magnetic portion 7a based on an output signal generated from the fourth magnetic sensor 11.

Each energization direction is switched in the following combination.

If the third magnetic sensor 10 detects an S pole of the magnet 2, each first magnetic portion 6a is excited to be an N pole. If the third magnetic sensor 10 detects an N pole of the magnet 2, each first magnetic portion 6a is excited to be an S pole.

If the fourth magnetic sensor 11 detects an S pole of the magnet 2, each second magnetic portion 7a is excited to be an S pole. If the fourth magnetic sensor 11 detects an N pole of the magnet 2, each second magnetic portion 7a is excited to be an N pole.

In the state illustrated in FIG. 6A, each of the third magnetic sensor 10 and the fourth magnetic sensor 11 detects an S pole of the magnet 2. As a result, each first magnetic portion 6a is excited to be an N pole and each second magnetic portion 7a an S pole respectively, causing a clockwise rotation force at both the rotor 3 and the magnet 2.

When the rotor 3 rotates clockwise from the state illustrated in FIG. 6A, the center Q1 of a magnetized pole of the magnet 2 and the center of each first magnetic portion 6a become opposed to each other as illustrated in FIG. 6B.

The third magnetic sensor 10 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the third magnetic sensor 10. This arrangement allows the third magnetic sensor 10 to detect an N pole of the magnet 2 at the time of the transition from the state illustrated in FIG. 6A to the state illustrated in FIG. 6B. At this transition, the first coil 4 is energized such that each first magnetic portion 6a is excited to be an S pole. In addition, since the fourth magnetic sensor 11 detects an S pole of the magnet 2, the second coil 5 is energized such that each second magnetic portion 7a is excited to be an S pole, causing a clockwise rotation force at both the rotor 3 and the magnet 2.

When the rotor 3 rotates clockwise from the state illustrated in FIG. 6B, the center Q2 of the magnetized pole of the magnet 2 and the center of the second magnetic portion 7a are opposed to each other as illustrated in FIG. 6D through the state illustrated in FIG. 6C.

The fourth magnetic sensor 11 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the fourth magnetic sensor 11. This arrangement allows the fourth magnetic sensor 11 to detect an N pole of the magnet 2 at the time of the transition from the state illustrated in FIG. 6C to the state illustrated in FIG. 6D. At this transition, the second coil 5 is energized such that each second magnetic portion 7a is excited to be an N pole. In addition, since the third magnetic sensor 10 detects an N pole of the magnet 2, the first coil 4 is energized such that each first magnetic portion 6a is excited to be an S pole, causing a clockwise rotation force at both the rotor 3 and the magnet 2.

As described above, the energization is sequentially switched to cause the rotor 3 and the magnet 2 to continuously rotate clockwise.

The third magnetic sensor 10 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the third magnetic sensor 10. This means that the third magnetic sensor 10 is arranged at a position where the advance angle amount from the position at which the electrical advance angle from the excitation switching timing of each first magnetic portion 6a is 0 degree is larger than the delay angle amount from the position at which the electrical advance angle from the excitation switching timing of each first magnetic portion 6a is 90 degrees. The fourth magnetic sensor 11 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the fourth magnetic sensor 11. This means that the fourth magnetic sensor 11 is arranged at a position where the advance angle amount from the position at which the electrical advance angle from the excitation switching timing of each second magnetic portion 7a is 0 degree is larger than the delay angle amount from the position at which the electrical advance angle from the excitation switching timing of each second magnetic portion 7a is 90 degrees. This arrangement yields a large rotation driving force because when the rotor 3 rotates at high speed, a timing at which each second magnetic portion 7a is magnetized is a timing at which the electrical advance angle substantially reaches 45 degrees. Consequently, the driving with such an electrical advance angle is desirable especially when the rotor 3 rotates clockwise at high speed.

(2) Counterclockwise Rotation (2-i) Driving with Low Advance Angle

An explanation will be given of counterclockwise rotation operations of the rotor 3 (third energization mode). These operations are done by switching the excitation state of each first magnetic portion 6a by an output signal generated from the third magnetic sensor 10 and by switching the excitation state of each second magnetic portion 7a by an output signal generated from the fourth magnetic sensor 11. The counterclockwise direction in which the rotor 3 rotates and which is a reverse direction compared with the first rotation direction is defined as a second rotation direction.

Each energization direction is switched in the following combination.

If the third magnetic sensor 10 detects an S pole of the magnet 2, each first magnetic portion 6a is excited to be an S pole. If the third magnetic sensor 10 detects an N pole of the magnet 2, each first magnetic portion 6a is excited to be an N pole.

If the fourth magnetic sensor 11 detects an S pole of the magnet 2, each second magnetic portion 7a is excited to be an N pole. If the fourth magnetic sensor 11 detects an N pole of the magnet 2, each second magnetic portion 7a is excited to be an S pole.

If the second magnetic sensor 9 detects an S pole of the magnet 2, each second magnetic portion 7a is excited to be an N pole. If the second magnetic sensor 9 detects an N pole of the magnet 2, each second magnetic portion 7a is excited to be an S pole.

In the state illustrated in FIG. 6A, each of the third magnetic sensor 10 and the fourth magnetic sensor 11 detects an S pole of the magnet 2. As a result, each first magnetic portion 6a is excited to be an S pole and each second magnetic portion 7a an N pole respectively, causing a counterclockwise rotation force at both the rotor 3 and the magnet 2.

When the rotor 3 rotates counterclockwise from the state illustrated in FIG. 6A, a center Q1 of a magnetized pole of the magnet 2 and the center of each second magnetic portion 7a become opposed to each other as illustrated in FIG. 6F.

When the rotor 3 rotates counterclockwise from the state illustrated in FIG. 6F, the distance from the center Q1 of the magnetized pole of the magnet 2 to the second magnetic portion 7a and the distance from a center Q3 of the pole of the magnet 2 which pole is magnetized reversely compared with the center Q1 to the first magnetic portion 6a become, as illustrated in FIG. 6G, the same.

The fourth magnetic sensor 11 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the fourth magnetic sensor 11. This arrangement allows the fourth magnetic sensor 11 to detect an N pole of the magnet 2 at the time of the transition from the state illustrated in FIG. 6F to the state illustrated in FIG. 6G. At this transition, the second coil 5 is energized such that each second magnetic portion 7a is excited to be an S pole. In addition, since the third magnetic sensor 10 detects an S pole of the magnet 2, the first coil 4 is energized such that each first magnetic portion 6a is excited to be an S pole, causing a counterclockwise rotation force at both the rotor 3 and the magnet 2.

When the rotor 3 rotates counterclockwise from the state illustrated in FIG. 6G, the center Q3 of the magnetized pole of the magnet 2 and the center of the first magnetic portion 6a are opposed to each other as illustrated in FIG. 6H.

When the rotor 3 rotates counterclockwise from the state illustrated in FIG. 6H, the distance from the center Q3 of the magnetized pole of the magnet 2 to the first magnetic portion 6a and the distance from the center Q3 to the second magnetic portion 7a become, as illustrated in FIG. 6I, the same.

The third magnetic sensor 10 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the third magnetic sensor 10. This arrangement allows the third magnetic sensor 9 to detect an N pole of the magnet 2 at the time of the transition from the state illustrated in FIG. 6H to the state illustrated in FIG. 6I. At this transition, the first coil 4 is energized such that each first magnetic portion 6a is excited to be an N pole. In addition, since the fourth magnetic sensor 11 detects an N pole of the magnet 2, the second coil 5 is energized such that each second magnetic portion 7a is excited to be an S pole, causing a counterclockwise rotation force at both the rotor 3 and the magnet 2.

As described above, the energization is sequentially switched to cause the rotor 3 and the magnet 2 to continuously rotate counterclockwise.

The third magnetic sensor 10 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the third magnetic sensor 10. The fourth magnetic sensor 11 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the fourth magnetic sensor 11. These arrangements lead to a reduced deviation in phase compared with the phase observed in a state in which the excitation is maintained without switching of the energization direction of each coil even if the energization direction of each coil is switched based on the output of each magnetic sensor. Hence, there is not a large difference between the phase of the rotor 3 and the magnet 2 observed in the case of a normal stepping driving and that observed in the case of the driving by switching of the energization of each coil based on the output of each magnetic sensor. Consequently, a smooth operation switching can be performed with no vibration or oscillation even if the stepping driving and the brushless driving in which the output of each sensor is feedback-controlled are switched. The driving with such an electrical advance angle is desirable especially when the driving is started from a stop state or when the shift is made from a driving state to a stop state.

(2-ii) Driving with High Advance Angle

The faster the rotation speed of the rotor 3 becomes, the slower a speed in which each magnetic portion is magnetized by a counter electromotive force or an inductance component becomes. Thus, a large rotation driving force can be obtained by switching the energization direction of each coil relative to the rotation position of the rotor 3 at an earlier timing.

An explanation will be given of counterclockwise rotation operations of the rotor 3 (fourth energization mode). These operations are done by switching the excitation state of each first magnetic portion 6a based on an output signal generated from the first magnetic sensor 8 and by switching the excitation state of each second magnetic portion 7a based on an output signal generated from the second magnetic sensor 9.

Each energization direction is switched in the following combination.

If the first magnetic sensor 8 detects an S pole of the magnet 2, each first magnetic portion 6a is excited to be an S pole. If the first magnetic sensor 8 detects an N pole of the magnet 2, each first magnetic portion 6a is excited to be an N pole.

If the second magnetic sensor 9 detects an S pole of the magnet 2, each second magnetic portion 7a is excited to be an N pole. If the second magnetic sensor 9 detects an N pole of the magnet 2, each second magnetic portion 7a is excited to be an S pole.

In the state illustrated in FIG. 6A, each of the first magnetic sensor 8 and the second magnetic sensor 9 detects an S pole of the magnet 2. As a result, each first magnetic portion 6a is excited to be an S pole and each second magnetic portion 7a an N pole respectively, causing a counterclockwise rotation force at both the rotor 3 and the magnet 2.

When the rotor 3 rotates counterclockwise from the state illustrated in FIG. 6A, the center Q1 of a magnetized pole of the magnet 2 and the center of each second magnetic portion 7a become opposed to each other as illustrated in FIG. 6F.

The second magnetic sensor 9 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the second magnetic sensor 9. This arrangement allows the second magnetic sensor 9 to detect an N pole of the magnet 2 at the time of the transition from the state illustrated in FIG. 6A to the state illustrated in FIG. 6F. At this transition, the second coil 5 is energized such that each second magnetic portion 7a is excited to be an S pole. In addition, since the first magnetic sensor 8 detects an S pole of the magnet 2, the first coil 4 is energized such that each first magnetic portion 6a is excited to be an S pole, causing a counterclockwise rotation force at both the rotor 3 and the magnet 2.

When the rotor 3 rotates counterclockwise from the state illustrated in FIG. 6F, the center Q3 of the magnetized pole of the magnet 2 and the center of the first magnetic portion 6a are opposed to each other as illustrated in FIG. 6H through the state illustrated in FIG. 6G.

The first magnetic sensor 8 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the first magnetic sensor 8. This arrangement allows the first magnetic sensor 8 to detect an N pole of the magnet 2 at the time of the transition from the state illustrated in FIG. 6G to the state illustrated in FIG. 6H. At this transition, the first coil 4 is energized such that each first magnetic portion 6a is excited to be an N pole. In addition, since the second magnetic sensor 9 detects an N pole of the magnet 2, the second coil 5 is energized such that each second magnetic portion 7a is excited to be an S pole, causing a counterclockwise rotation force at both the rotor 3 and the magnet 2.

As described above, the energization is sequentially switched to cause the rotor 3 and the magnet 2 to continuously rotate counterclockwise.

The first magnetic sensor 8 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the first magnetic sensor 8. The second magnetic sensor 9 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the second magnetic sensor 9. These arrangements yield a large rotation driving force because when the rotor 3 rotates at high speed, a timing at which each magnetic portion is magnetized is a timing at which the electrical advance angle substantially reaches 45 degrees. Consequently, the driving with such an electrical advance angle is desirable especially when the rotor 3 rotates counterclockwise at high speed.

As described above, in the case of clockwise rotation, each sensor is arranged as follows. The first magnetic sensor 8 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the first magnetic sensor 8.

The second magnetic sensor 9 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the second magnetic sensor 9.

The third magnetic sensor 10 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the third magnetic sensor 10.

The fourth magnetic sensor 11 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the fourth magnetic sensor 11.

On the other hand, in the case of counterclockwise rotation, each magnetic sensor is arranged as follows. The first magnetic sensor 8 is arranged such that the excitation switching timing of each first magnetic portion 6a relative to the rotation position of the rotor 3 falls within a range of electrical advance angles of 45 to 90 degrees when a pole excited by each first magnetic portion 6a is switched based on the output of the first magnetic sensor 8.

The second magnetic sensor 9 is arranged such that the excitation switching timing of each second magnetic portion 7a relative to the rotation position of the rotor 3 falls within a range of electrical advance angles of 45 to 90 degrees when a pole excited by each second magnetic portion 7a is switched based on the output of the second magnetic sensor 9.

The third magnetic sensor 10 is arranged such that the excitation switching timing of each first magnetic portion 6a relative to the rotation position of the rotor 3 falls within a range of electrical advance angles of 0 to 45 degrees when a pole excited by each first magnetic portion 6a is switched based on the output of the third magnetic sensor 10.

The fourth magnetic sensor 11 is arranged such that the excitation switching timing of each second magnetic portion 7a relative to the rotation position of the rotor 3 falls within a range of electrical advance angles of 0 to 45 degrees when a pole excited by each second magnetic portion 7a is switched based on the output of the fourth magnetic sensor 11.

From a practical standpoint, each magnet sensor needs to be arranged at an appropriate position where a large rotation driving force can be obtained, taking into consideration factors such as magnetization errors of the magnet 2, sensor size errors, and yoke errors.

With consideration given to such factors, in the case of clockwise rotation, each magnetic sensor is preferably arranged as follows. The first magnetic sensor 8 is preferably arranged such that the excitation switching timing of the first stator unit falls within a range of electrical advance angle of 14.4 to 33.6 degrees. The third magnetic sensor 10 is preferably arranged such that the excitation switching timing of each first magnetic portion 6a falls within a range of electrical advance angle of 56.4 to 75.6 degrees. The second magnetic sensor 9 is preferably arranged such that the excitation switching timing of each second magnetic portion 7a falls within a range of electrical advance angle of 14.4 to 33.6 degrees. The fourth magnetic sensor 11 is preferably arranged such that the excitation switching timing of each second magnetic portion 7a falls within a range of electrical advance angle of 56.4 to 75.6 degrees.

On the other hand, in the case of counterclockwise rotation, each magnetic sensor is preferably arranged as follows. The first magnetic sensor 8 is preferably arranged such that the excitation switching timing of each first magnetic portion 6a falls within a range of electrical advance angle of 56.4 to 75.6 degrees. The third magnetic sensor 10 is preferably arranged such that the excitation switching timing of each first magnetic portion 6a falls within a range of electrical advance angle of 14.4 to 33.6 degrees. The second magnetic sensor 9 is preferably arranged such that the excitation switching timing of each second magnetic portion 7a falls within a range of electrical advance angle of 56.4 to 75.6 degrees. The fourth magnetic sensor 11 is preferably arranged such that the excitation switching timing of each second magnetic portion 7a falls within a range of electrical advance angle of 14.4 to 33.6 degrees.

Furthermore, consideration should be given to avoid a situation that the characteristics of rotation in both clockwise and counterclockwise directions are lost. That is to say, each magnetic sensor needs to be arranged such that the middle point of a line connecting the first magnetic sensor 8 and the third magnetic sensor 10 is located at a position where the excitation switching timing of each first magnetic portion 6a reaches an electrical advance angle of 45 degrees. Likewise, each magnetic sensor needs to be arranged such that the middle point of a line connecting the second magnetic sensor 9 and the fourth magnetic sensor 11 is located at a position where the excitation switching timing of each second magnetic portion 7a reaches an electrical advance angle of 45 degrees.

In this embodiment, two different sensor units are employed. One is a unit including the first magnetic sensor 8 and the third magnetic sensor 10. The other is a unit including the second magnetic sensor 9 and the fourth magnetic sensor 11. In the case of clockwise rotation, the first magnetic sensor 8 is arranged at a position where the excitation switching timing of each first magnetic portion 6a reaches an electrical advance angle of 21 degrees and the third magnetic sensor 10 at a position where the excitation switching timing of each first magnetic portion 6a reaches an electrical advance angle of 69 degrees, respectively. The second magnetic sensor 9 is arranged at a position where the excitation switching timing of each second magnetic portion 7a reaches an electrical advance angle of 21 degrees and the fourth magnetic sensor 11 at a position where the excitation switching timing of each second magnetic portion 7a reaches an electrical advance angle of 69 degrees, respectively.

Figure 7:
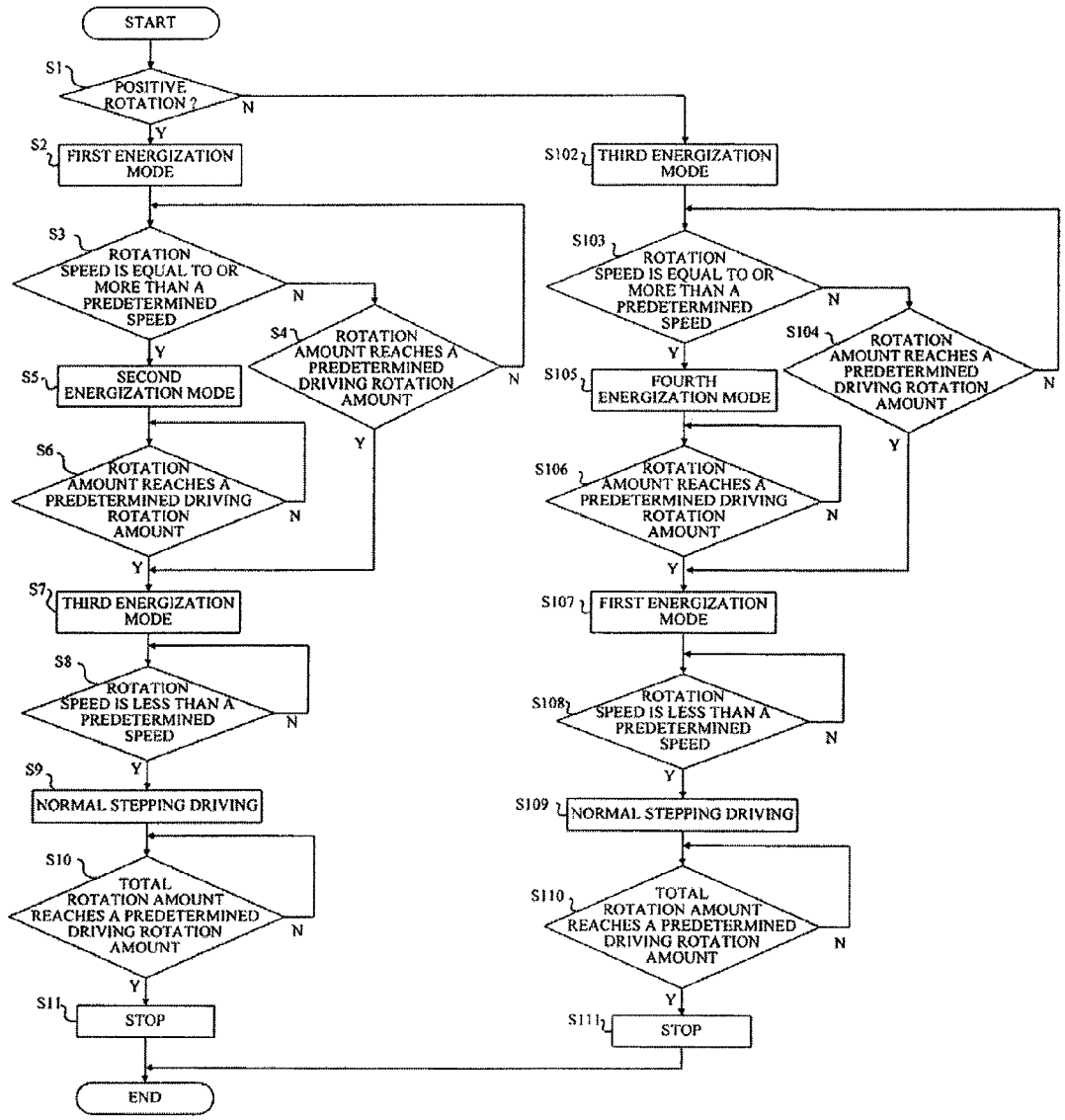
FIG. 7 is a flow chart of a motor control method.
Figure 8A:
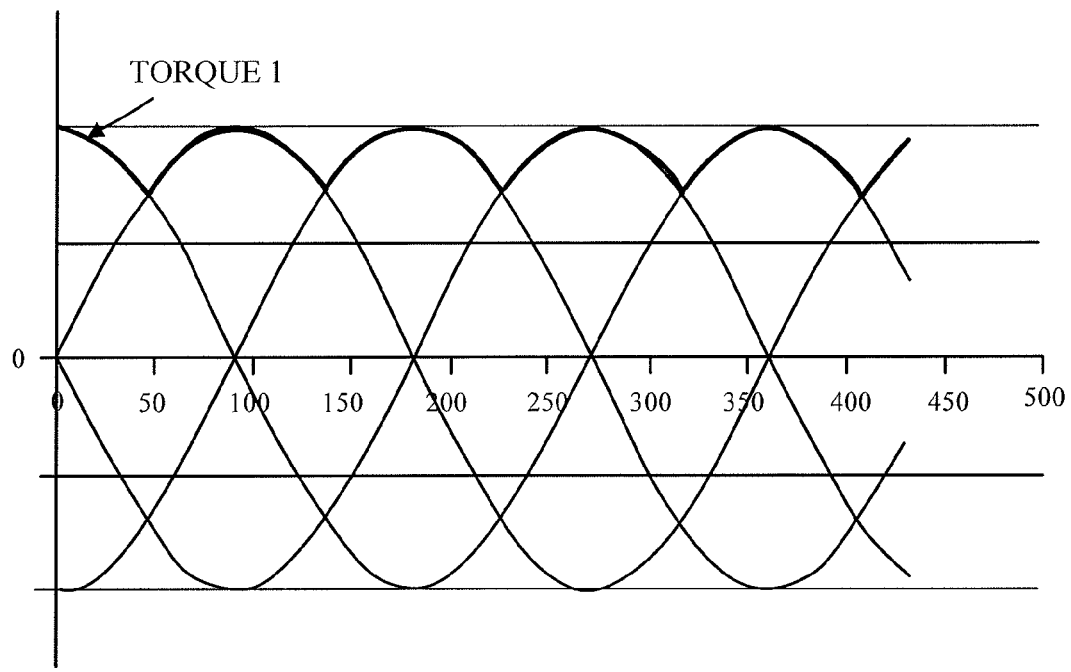
FIGS. 8A and 8B illustrate torques acting on the rotor when a constant current is passed through the coils of the motor.
Figure 8B:
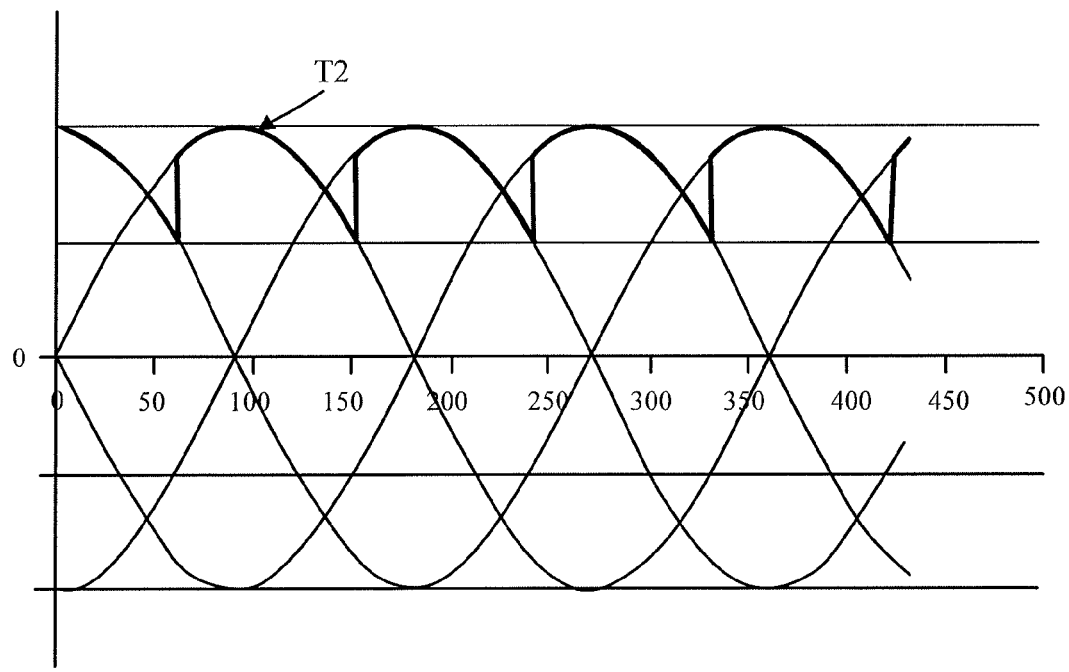

Referring now to a flowchart of FIG. 7, a method for controlling the driving of the motor 1 will be described.

First, it is hypothesized that a driving rotation amount A is set.

In step S1, the rotation direction of the rotor 3 is selected. The process proceeds to step S2 if the rotation direction is clockwise or step S102 if the rotation direction is counterclockwise.

In step S2, an energization in the first energization mode is performed. More specifically, the excitation of each first magnetic portion 6a and each second magnetic portion 7a is switched based on the output of the first magnetic sensor 8 and the second magnetic sensor 9 respectively to cause the rotor 3 and magnet 2 to rotate clockwise.

In step S3, the rotation speed of the rotor 3 is determined. The rotation speed of the rotor 3 may be measured by using each magnetic sensor or by using known speed detectors (not illustrated in the figure). If the rotation speed is less than a predetermined speed, the process proceeds to step S4, or if the rotation speed is equal to or more than such predetermined speed, the process proceeds to step S5.

In step S4, the driving rotation amount of the rotor 3 is determined. If the total rotation amount reaches the driving rotation amount A less a predetermined amount B, the process proceeds to step S7.

In step S5, an energization in the second energization mode is performed. More specifically, the excitation of each first magnetic portion 6a and each second magnetic portion 7a is switched based on the output of the third magnetic sensor 10 and the fourth magnetic sensor 11 respectively to cause the rotor 3 and magnet 2 to rotate clockwise.

In step S6, the driving rotation amount of the rotor 3 is determined. If the total rotation amount reaches the driving rotation amount A less a predetermined amount B, the process proceeds to step S7.

In step S7, an energization in the second energization mode is performed. More specifically, the excitation of each first magnetic portion 6a and each second magnetic portion 7a is switched based on the output of the third magnetic sensor 10 and the fourth magnetic sensor 11 respectively to cause the rotor 3 and magnet 2 to rotate counterclockwise. During this counterclockwise rotation, the rotor 3 and the magnet 2 are rapidly slowed down due to a clockwise-direction driving force given to them, but with their counterclockwise rotation being continued by virtue of their inertial mass. An energization in the fourth energization mode may be alternatively performed in step S7.

In step S8, the rotation speed of the rotor 3 is determined. When the rotor 3 is slowed down to a predetermined rotation speed, the process proceeds to step S9.

In step S9, the driving mode is switched from brushless driving in which the energization direction is switched by the feedback of an output generated from each magnetic sensor to stepping driving with an pulse signal, which is a driving method for normal PM2-type two-phase stepping motors.

In step S10, if the total rotation amount reaches the driving rotation amount A, the process proceeds to step S11. In step S11, the stepping driving is stopped to stop the rotor 3 at a target position.

In step S102, an energization in the third energization mode is performed. More specifically, the excitation of each first magnetic portion 6a and each second magnetic portion 7a is switched based on the output of the third magnetic sensor 10 and the fourth magnetic sensor 11 respectively to cause the rotor 3 and magnet 2 to rotate counterclockwise.

In step S103, the rotation speed of the rotor 3 is determined. More specifically, the rotation speed of the rotor 3 may be measured by using each magnetic sensor or by using known speed detectors (not illustrated in the figure). If the rotation speed is less than a predetermined speed, the process proceeds to step S104, or if the rotation speed is equal to or more than such predetermined speed, the process proceeds to step S105.

In step S104, the driving rotation amount of the rotor 3 is determined. If the total rotation amount reaches the driving rotation amount A less a predetermined amount B, the process proceeds to step S107.

In step S105, an energization in the fourth energization mode is performed. More specifically, the excitation of each first magnetic portion 6a and each second magnetic portion 7a is switched based on the output of the first magnetic sensor 8 and the second magnetic sensor 9 respectively to cause the rotor 3 and magnet 2 to rotate counterclockwise.

In step S106, the driving rotation amount of the rotor 3 is determined. If the total rotation amount reaches the driving rotation amount A less a predetermined amount B, the process proceeds to step S107.

In step S107, an energization in the first energization mode is performed. More specifically, the excitation of each first magnetic portion 6a and each second magnetic portion 7a is switched based on the output of the first magnetic sensor 8 and the second magnetic sensor 9 respectively to cause the rotor 3 and magnet 2 to rotate clockwise. During this clockwise rotation, the rotor 3 and the magnet 2 are rapidly slowed down due to a counterclockwise-direction driving force given to them, but with their clockwise rotation being continued by virtue of their inertial mass. An energization in the second energization mode may be alternatively performed in step S107.

In step S108, the rotation speed of the rotor 3 is determined. When the rotor 3 is slowed down to a predetermined rotation speed, the process proceeds to step S109.

In step S109, the driving mode is switched from brushless driving in which the energization direction is switched by the feedback of an output generated from each magnetic sensor to stepping driving with an pulse signal, which is a driving method for normal PM2-type two-phase stepping motors.

In step S110, if the total rotation amount reaches the driving rotation amount A, the process proceeds to step S111. In step S111, the stepping driving is stopped to stop the rotor 3 at a target position.

As described above, in this embodiment, a plurality of advance angles can be set with no delay time. This setting permits driving control with two different advance angles in both clockwise and counterclockwise rotation directions.

Moreover, an energization, at the time of transition from driving state to stop state, in a phase with an energization advance angle observed during the reverse rotation allows a rapid slow down, which in turn leads to a higher stop control ability.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-284086, filed on Dec. 27, 2012, which is hereby incorporated by reference herein in its entirety.

INDUSTRIAL APPLICABILITY

The present invention provides a motor driving apparatus which is capable of setting a plurality of advance angles with no delay time and thus causes no loss of synchronization.

REFERENCE SIGNS LIST

1 MOTOR
2 MAGNET
3 ROTOR
4 FIRST COIL
5 SECOND COIL
6 FIRST YOKE
6a FIRST MAGNETIC PORTION
7 SECOND YOKE
7a SECOND MAGNETIC PORTION
8 FIRST MAGNETIC SENSOR
9 SECOND MAGNETIC SENSOR
10 THIRD MAGNETIC SENSOR
11 FOURTH MAGNETIC SENSOR
12 MOTOR COVER
13 CONTROL CIRCUIT

The invention claimed is:

1. A motor driving apparatus comprising:
a rotor including a magnet, the magnet being cylindrical shaped and divided, in a peripheral direction, into sections each with an outer periphery, each section having a different polarity from adjacent sections;
a first yoke including a first magnetic portion, the first yoke being opposed to the outer periphery of the magnet;
a first coil configured to, if energized, excite the first magnetic portion;
a second yoke including a second magnetic portion, the second yoke being opposed to the outer periphery of the magnet at a position displaced by an electrical angel of 90 degrees relative to the first magnetic portion;
a second coil configured to, if energized, excite the second magnetic portion;
a detecting portion including a first detection element, a second detection element, a third detection element, and a fourth detection element, each detection element being configured to detect a rotation position of the rotor; and
a controller configured to switch a pole excited by the first magnetic portion and the second magnetic portion by switching an energization direction of the first coil and the second coil based on an output of the detecting portion,
wherein the first detection element is arranged at a position where an advance angle amount from a position at which an electrical advance angle from an excitation switching timing of each first magnetic portion is 0 degree is smaller than a delay angle amount from a position at which an electrical advance angle from an excitation switching timing of each first magnetic portion is 90 degrees if the rotor is caused to rotate in a first rotation direction and if a pole excited by the first magnetic portion is switched based on an output of the first detection element,
wherein the second detection element is arranged at a position where an advance angle amount from a position at which an electrical advance angle from an excitation switching timing of each second magnetic portion is 0 degree is smaller than a delay angle amount from a position at which an electrical advance angle from an excitation switching timing of each second magnetic portion is 90 degrees if the rotor is caused to rotate in the first rotation direction and if a pole excited by the second magnetic portion is switched based on an output of the second detection element,
wherein the third detection element is arranged at a position where an advance angle amount from a position at which an electrical advance angle from an excitation switching timing of each first magnetic portion is 0 degree is larger than a delay angle amount from a position at which an electrical advance angle from an excitation switching timing of each first magnetic portion is 90 degrees if the rotor is caused to rotate in the first rotation direction and if a pole excited by the first magnetic portion is switched based on an output of the third detection element, and
wherein the fourth detection element is arranged at a position where an advance angle amount from a position at which an electrical advance angle from an excitation switching timing of each second magnetic portion is 0 degree is larger than a delay angle amount from a position at which an electrical advance angle from an excitation switching timing of each second magnetic portion is 90 degrees if the rotor is caused to rotate in the first rotation direction and if a pole excited by the second magnetic portion is switched based on an output of the fourth detection element.

2. The motor driving apparatus according to claim 1,
wherein the first detection element is arranged at a position where an excitation switching timing of each first magnetic portion relative to a rotation position of the rotor falls within a range of electrical advance angles of 0 to 45 degrees if the rotor is caused to rotate in the first rotation direction and if a pole excited by the first magnetic portion is switched based on an output of the first detection element,
wherein the second detection element is arranged at a position where an excitation switching timing of each second magnetic portion relative to a rotation position of the rotor falls within a range of electrical advance angles of 0 to 45 degrees if the rotor is caused to rotate in the first rotation direction and if a pole excited by the second magnetic portion is switched based on an output of the second detection element,
wherein the third detection element is arranged at a position where an excitation switching timing of each first magnetic portion relative to a rotation position of the rotor falls within a range of electrical advance angles of 45 to 90 degrees if the rotor is caused to rotate in the first rotation direction and if a pole excited by the first magnetic portion is switched based on an output of the third detection element, and
wherein the fourth detection element is arranged at a position where an excitation switching timing of each second magnetic portion relative to a rotation position of the rotor falls within a range of electrical advance angles of 45 to 90 degrees if the rotor is caused to rotate in the first rotation direction and if a pole excited by the second magnetic portion is switched based on an output of the fourth detection element.

3. The motor driving apparatus according to claim 2,
wherein the first detection element is arranged at a position where an excitation switching timing of each first magnetic portion relative to a rotation position of the rotor falls within a range of electrical advance angles of 45 to 90 degrees if the rotor is caused to rotate in a second rotation direction, which is a reverse direction to the first rotation direction, and if a pole excited by the first magnetic portion is switched based on an output of the first detection element,
wherein the second detection element is arranged at a position where an excitation switching timing of each second magnetic portion relative to a rotation position of the rotor falls within a range of electrical advance angles of 45 to 90 degrees if the rotor is caused to rotate in the second rotation direction and if a pole excited by the second magnetic portion is switched based on an output of the second detection element,
wherein the third detection element is arranged at a position where an excitation switching timing of each first magnetic portion relative to a rotation position of the rotor falls within a range of electrical advance angles of 0 to 45 degrees if the rotor is caused to rotate in the second rotation direction and if a pole excited by the first magnetic portion is switched based on an output of the third detection element, and
wherein the fourth detection element is arranged at a position where an excitation switching timing of each second magnetic portion relative to a rotation position of the rotor falls within a range of electrical advance angles of 0 to 45 degrees if the rotor is caused to rotate in the second rotation direction and if a pole excited by the second magnetic portion is switched based on an output of the fourth detection element.

4. The motor driving apparatus according to claim 1, further comprising:
a speed detecting portion,
wherein the controller switches an energization direction of the first coil based on an output of the first detection element and an energization direction of the second coil based on an output of the second detection element if the rotor is caused to rotate in the first rotation direction and if a rotation speed of the rotor detected by the speed detecting portion is less than a predetermined rotation speed,
wherein the controller switches an energization direction of the first coil based on an output of the third detection element and an energization direction of the second coil based on an output of the fourth detection element if the rotor is caused to rotate in the first rotation direction and if a rotation speed of the rotor detected by the speed detecting portion is equal to or more than the predetermined rotation speed,
wherein the controller switches an energization direction of the first coil based on an output of the third detection element and an energization direction of the second coil based on an output of the fourth detection element if the rotor is caused to rotate in a second rotation direction, which is a reverse direction to the first rotation direction, and if a rotation speed of the rotor detected by the speed detecting portion is less than the predetermined rotation speed,
wherein the controller switches an energization direction of the first coil based on an output of the first detection element and an energization direction of the second coil based on an output of the second detection element if the rotor is caused to rotate in the second rotation direction and if a rotation speed of the rotor detected by the speed detecting portion is equal to or more than the predetermined rotation speed.

5. The motor driving apparatus according to claim 2,
wherein the first detection element is arranged at an position where an excitation timing of the first magnetic portion relative to a rotation position of the rotor falls within a range of electrical advance angle of 14.4 to 33.6 degrees if the rotor is caused to rotate in the first rotation direction and if a pole excited by the first magnetic portion is switched based on an output of the first detection element,
wherein the second detection element is arranged at an position where an excitation timing of the second magnetic portion relative to a rotation position of the rotor falls within a range of electrical advance angle of 14.4 to 33.6 degrees if the rotor is caused to rotate in the first rotation direction and if a pole excited by the second magnetic portion is switched based on an output of the second detection element,
wherein the third detection element is arranged at an position where an excitation timing of the first magnetic portion relative to a rotation position of the rotor falls within a range of electrical advance angle of 56.4 to 75.6 degrees if the rotor is caused to rotate in the first rotation direction and if a pole excited by the first magnetic portion is switched based on an output of the third detection element, and
wherein the fourth detection element is arranged at an position where an excitation timing of the second magnetic portion relative to a rotation position of the rotor falls within a range of electrical advance angle of 56.4 to 75.6 degrees if the rotor is caused to rotate in the first rotation direction and if a pole excited by the second magnetic portion is switched based on an output of the fourth detection element.

6. The motor driving apparatus according to claim 3,
wherein the first detection element is arranged at an position where an excitation timing of the first magnetic portion relative to a rotation position of the rotor falls within a range of electrical advance angle of 56.4 to 75.6 degrees if the rotor is caused to rotate in the second rotation direction and if a pole excited by the first magnetic portion is switched based on an output of the first detection element,
wherein the second detection element is arranged at an position where an excitation timing of the second magnetic portion relative to a rotation position of the rotor falls within a range of electrical advance angle of 56.4 to 75.6 degrees if the rotor is caused to rotate in the second rotation direction and if a pole excited by the second magnetic portion is switched based on an output of the second detection element,
wherein the third detection element is arranged at an position where an excitation timing of the first magnetic portion relative to a rotation position of the rotor falls within a range of electrical advance angle of 14.4 to 33.6 degrees if the rotor is caused to rotate in the second rotation direction and if a pole excited by the first magnetic portion is switched based on an output of the third detection element, and
wherein the fourth detection element is arranged at an position where an excitation timing of the second magnetic portion relative to a rotation position of the rotor falls within a range of electrical advance angle of 14.4 to 33.6 degrees if the rotor is caused to rotate in the second rotation direction and if a pole excited by the second magnetic portion is switched based on an output of the fourth detection element.

* * * * *